Sept. 13, 1932.　　　W. F. MacGREGOR　　　1,877,518
COMBINATION HARVESTER THRESHER
Filed Oct. 14, 1929　　2 Sheets-Sheet 1
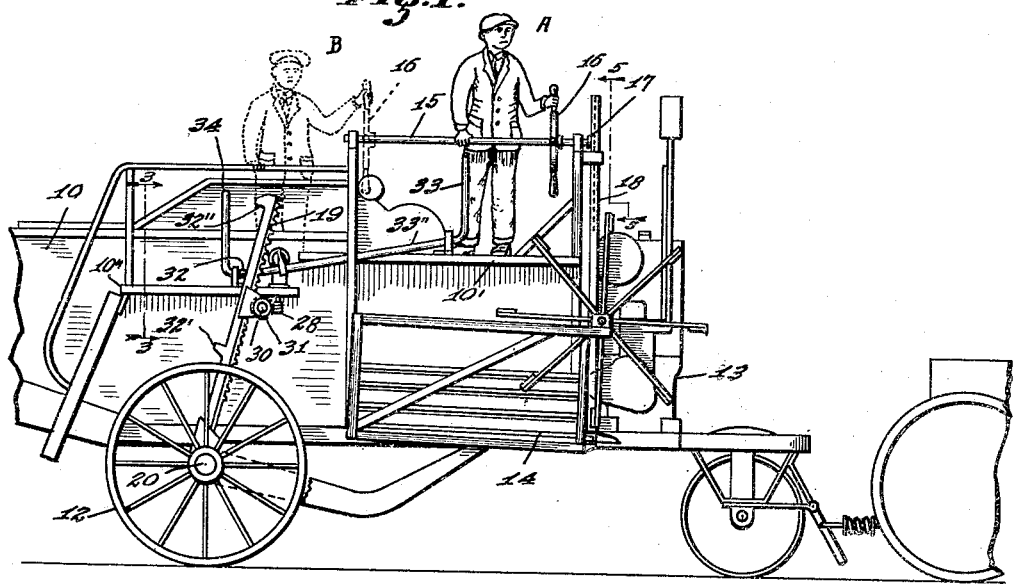
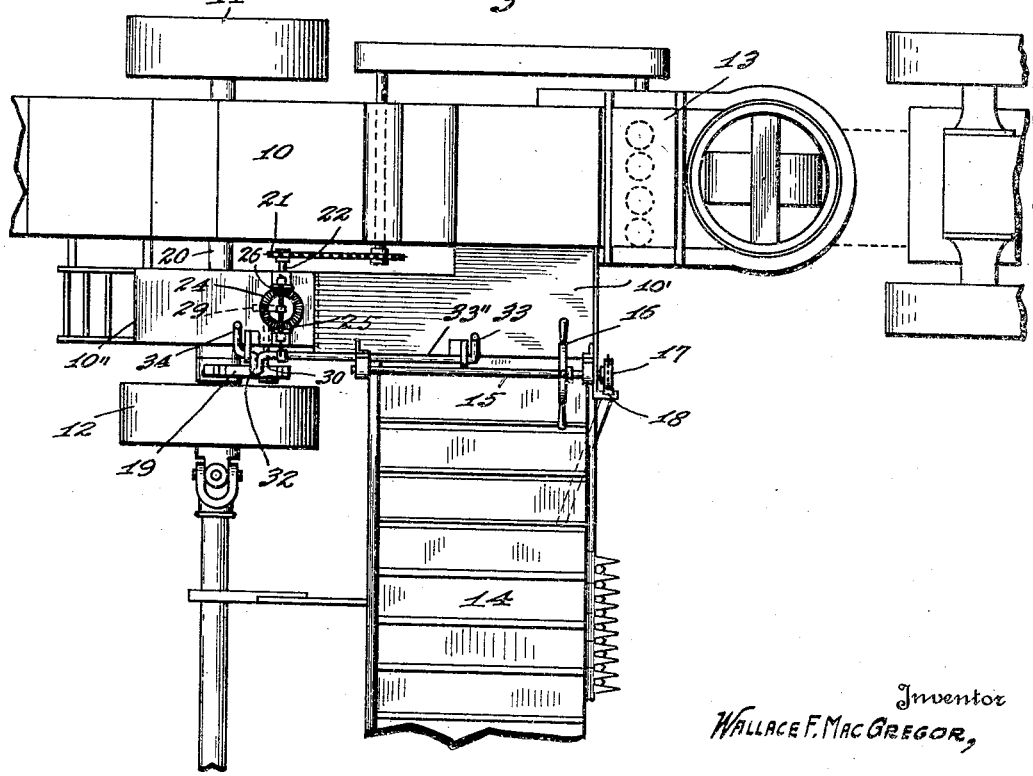
Inventor
WALLACE F. MAC GREGOR,
By James A. Walsh.
Attorney

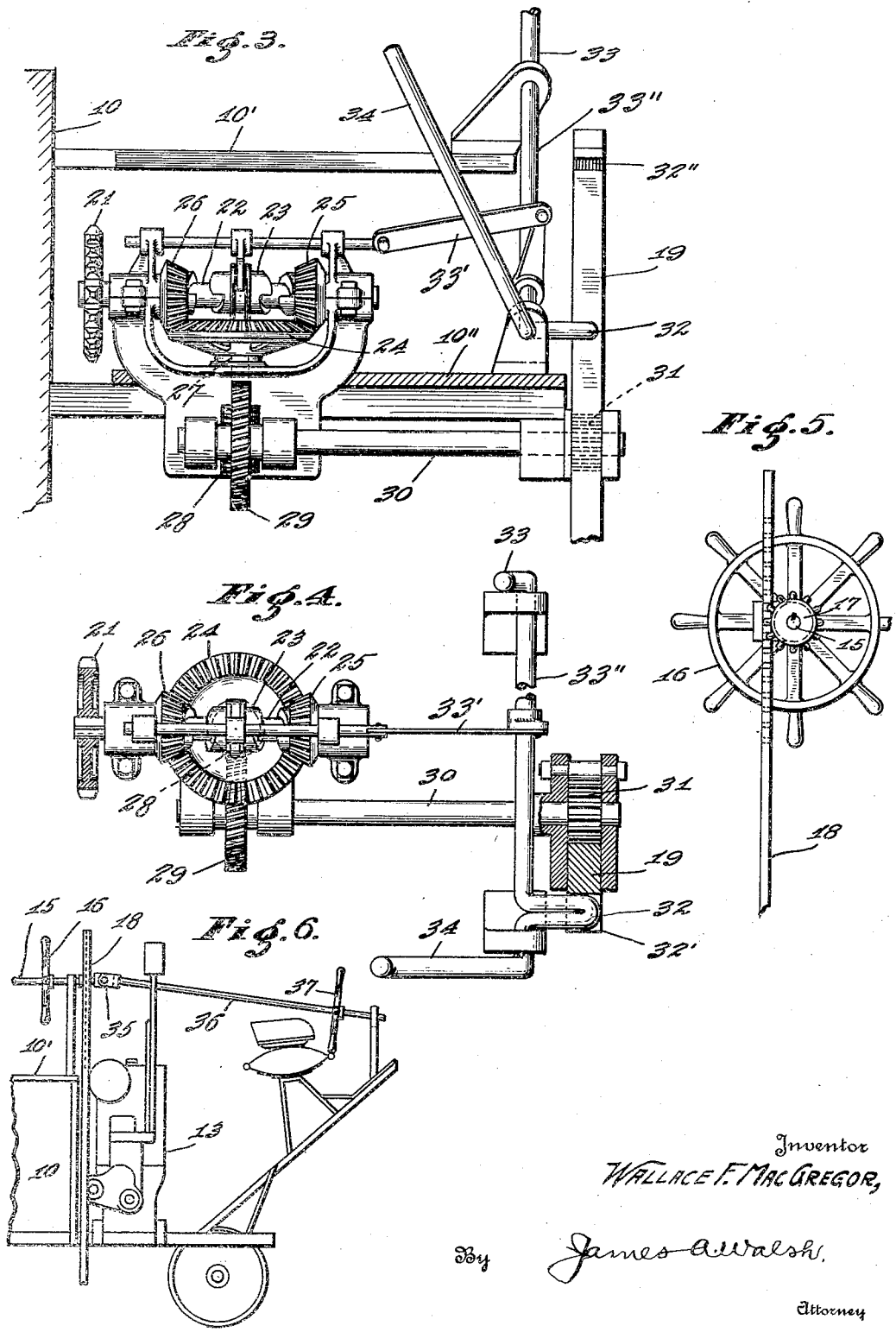

Patented Sept. 13, 1932

1,877,518

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

COMBINATION HARVESTER-THRESHER

Application filed October 14, 1929. Serial No. 399,503.

My invention relates to improvements in combination harvester-threshers of the type designed especially for use in hilly territory where frequent manipulation of leveling mechanisms is necessary, as well as adjustments of the header, to meet ground irregularities, and it is my object to provide means whereby an attendant may manipulate the header adjusting mechanisms when standing on the forward end of the platform of the machine and as readily perform the same service when at the opposite end of or beyond such platform, and is also enabled to manipulate the thresher leveling devices from either of the stations mentioned, in the manner hereinafter explained.

In the accompanying drawings, forming part hereof, Figure 1 is a side elevation of a combine showing operators on the platform of the thresher; Fig. 2, a plan view of the machine; Fig. 3, a detail elevation of the leveling mechanism taken on the dotted line 3—3 in Fig. 1; Fig. 4, a detail plan of the leveling mechanism; Fig. 5, a detail elevation of the tiller-wheel and associated mechanisms taken on the dotted line 5—5 in Fig. 1; and Fig. 6, is a fragmentary side elevation of the thresher showing a modified form of the header adjusting devices.

In said drawings the numeral 10 indicates the thresher element of the machine, generally known as a combine, which is supported on the wheels 11, 12, and carries an engine 13 for operating the machine, comprising said thresher and a header 14. Upon the side of the thresher adjacent the header a platform 10' extends from the front to substantially midway of the thresher for the accommodation of an attendant, as A, who adjusts the header to suit ground conditions. Supported upon the platform is a shaft 15 provided with a tiller-wheel 16 and a pinion 17, the latter engaging a link 18 connected at its lower end to the header 14, and by which mechanisms the header is adjusted vertically in a well known manner. In my improvement I extend the shaft 15 rearwardly in parallel relation to the platform 10' and which terminates adjacent the leveling mechanisms of the thresher, the tiller-wheel 16 being slidably mounted on said shaft. When a single attendant only, as A, is on the platform and it becomes necessary to perform both duties of adjusting the header and controlling the leveling mechanisms, the tiller-wheel 16 is shifted to the rear end of shaft 15 as indicated by the dotted lines, so that said attendant by moving rearwardly can readily manipulate the tiller-wheel to actuate said shaft and the link 18 to vertically adjust the header, while at the same time he is within convenient reach of control of the leveling mechanisms.

As is well understood, hillside harvesters are equipped with desired leveling devices for maintaining the thresher in substantially horizontal position, a suitable arrangement being a rack-bar 19 which may be clamped or otherwise secured to a stud shaft 20. A sprocket 21 driven from a suitable source of power from the thresher is mounted on a shaft 22 carrying a clutch 23 which is free to move longitudinally with the shaft at will by a suitable link system as shown. A bevel gear 24 constantly engages the bevel pinions 25, 26, which are freely mounted on shaft 22, and which gear is securely fastened to shaft 27, and at the lower end of the latter shaft a worm pinion 28 is provided which rotates a worm 29 secured to shaft 30. A rack pinion 31 is secured to or integrally formed with shaft 30 and actuates the rack-bar 19, as indicated in Fig. 1. The sprocket 21 and clutch 23 revolve continuously while the machine is in operation, and, therefore, when the clutch is in the position shown in Fig. 3 the bevel gear will remain in fixed position so that the rack-bar 19 may be retained in any desired position during its vertical movements; and when clutch 23 is engaged with either of the bevel pinions 25, 26, the bevel gear will revolve, the direction of rotation being governed by the pinion engaged. Therefore, as the bevel gear reverses, shaft 30 rotates through the pinion 28 and worm-gear 29, and as pinion 31 is rotated the rack 19 will be raised and lowered in a vertical direction. The leveling wheel 12 is yieldingly secured to the thresher body by a link system of any desired arrangement (not shown) so that as the machine traverses a hillside said wheel can be adjusted vertically by the rack-bar 19, in a well known manner. The rack-bar 19 is also provided with safety means, such as the stops 32′ and 32″, whereby its movement in downward or upward direction will be limited by the stops contacting with the projection 32 forming part of rod 33″, so that disengagement with the clutch 23 will occur and the rack-bar held in fixed position. The leveling mechanisms thus described indicate a desirable arrangement for the purpose, but which may be of any appropriate character for controlling the vertical movements of the thresher body and leveling wheel.

A supplemental platform 10″ is installed alongside the thresher in connection with the leveling mechanism for the support of an attendant, as B, in charge of the proper operation and frequent changing of the leveling mechanism to meet ground inequalities, so that in common practice an attendant, as A, manipulates the header adjusting mechanisms by the tiller-wheel at the front end of the platform 10′, and the attendant, as B, on platform 10″ gives his attention to the leveling devices and other duties. In order to simplify control of the leveling devices by an attendant on platform 10′, or by the one on platform 10″, I connect to the clutch 23 a throw-out comprising an arm 33′, which is secured to the rod 33″ mounted on platforms 10′ and 10″, said rod having upturned ends constituting forward and rear handles 33, 34, the forward handle 33 being positioned substantially midway of platform 10′ so that it may be manipulated to engage and disengage the clutch 23 by the attendant stationed whether at the forward or rear end of platform 10′, or the rear handle 34, according to circumstances, may be readily manipulated by him, or the attendant B on platform 10″ when two such attendants are present. The rod 33″ embodies a stop 32, as stated, adapted to engage the stops 32′ and 32″ associated with rack-bar 19 to limit the movement of the latter in vertical directions. It will be understood, therefore, that I provide inexpensive and simple means for conveniently controlling the adjustments of both the header and the leveling devices by one or two attendants according to circumstances, and also that instead of employing a hand-wheel as 16 shiftable from front to rear or reversely on shaft 15 my improvement contemplates the use of two hand-wheels, that is, one at the forward and the other at the rear end of said shaft, so that with the latter arrangement shifting of tiller-wheel 16 will be unnecessary, and in the manner explained it will be understood that dual control of the header and leveling adjustments is provided; in other words, these devices may be readily manipulated by an attendant either at the front of the platform 10′ or at the rear thereof according to circumstances, or where there is an attendant on each of the platforms either one may temporarily leave his station and his duties may be readily performed by the other. Some types of combines are drawn by animals, requiring an elevated and quite remote driver's seat supported in front of the machine, and in such situation I am enabled to control the header adjusting mechanisms by providing a flexible or universal coupling 35 on said shaft 15, which connects a shaft section 36 extending forwardly in proximity to the driver, and which extension shaft is provided with a tiller-wheel 37 for convenient control by the driver for adjusting the header.

I claim as my invention:

1. In a combination harvester-thresher the latter element of which embodies a platform, a shaft mounted on the platform, means connected to the shaft for adjusting the header of such machine, and a hand-wheel on the shaft for rotating the latter to actuate said adjusting means, said wheel being slidably mounted on the shaft and adapted to be moved therealong whereby the shaft may be rotated by an attendant at the forward and rear ends of the platform to actuate said adjusting means.

2. In a combination harvester-thresher the latter element of which embodies a platform, a shaft mounted on the platform, means connected to the shaft and to the harvester for adjusting the latter, and means movable along the shaft whereby the latter may be rotated by an attendant adjacent the forward and rear ends of the shaft to actuate said adjusting means.

3. In a combination harvester-thresher, a shaft support on the thresher, a shaft mounted on the support, means connected to the shaft and to the harvester for vertically adjusting the latter, and means on the shaft whereby the latter may be rotated by an attendant from various positions in relation to the shaft.

4. In a combination harvester-thresher, a shaft on the thresher, a pinion on the shaft, a rack-bar engaging the pinion and secured to the harvester, and means on the shaft and movable therealong for rotating the latter to actuate the pinion and rack-bar to vertically adjust the harvester.

5. In a combination harvester-thresher, a shaft supported by the thresher, means connected to the harvester and engaging the shaft for vertically adjusting the harvester, and means on the shaft operable at various locations thereon whereby said shaft may be rotated by an attendant from different positions in relation to the shaft.

In testimony whereof I affix my signature.

WALLACE F. MacGREGOR.